United States Patent
Sohya et al.

(10) Patent No.: US 7,133,904 B1
(45) Date of Patent: Nov. 7, 2006

(54) CLIENT SERVER SYSTEM, SERVER, CLIENT, PROXY SERVER CONTROL METHOD, PROXY SERVER FUNCTION PROVISION METHOD, STORAGE MEDIUM AND PROGRAM TRANSMISSION APPARATUS

(75) Inventors: Toshio Sohya, Komae (JP); Yoshinori Aoki, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 915 days.

(21) Appl. No.: 09/706,608

(22) Filed: Nov. 6, 2000

(30) Foreign Application Priority Data

Nov. 9, 1999 (JP) .................................. 11-318628

(51) Int. Cl.
*G06F 15/16* (2006.01)
(52) U.S. Cl. ...................................... 709/218
(58) Field of Classification Search ................ 709/223, 709/232, 203, 217, 218, 219, 250; 713/2, 713/153, 164, 201; 370/252, 254
See application file for complete search history.

(56) References Cited

U.S. PATENT DOCUMENTS

| | | | |
|---|---|---|---|
| 5,742,762 A * | 4/1998 | Scholl et al. | |
| 5,996,010 A * | 11/1999 | Leong et al. | ................ 709/223 |
| 6,003,077 A * | 12/1999 | Bawden et al. | ............. 709/223 |
| 6,112,228 A * | 8/2000 | Earl et al. | |
| 6,182,226 B1 * | 1/2001 | Reid et al. | ................... 713/201 |
| 6,230,271 B1 * | 5/2001 | Wadlow et al. | ............. 713/201 |
| 6,308,206 B1 * | 10/2001 | Singh | ......................... 709/223 |
| 6,363,421 B1 * | 3/2002 | Barker et al. | ............... 709/223 |
| 6,397,245 B1 * | 5/2002 | Johnson, II et al. | ........ 709/223 |
| 6,470,386 B1 * | 10/2002 | Combar et al. | |
| 6,473,407 B1 * | 10/2002 | Ditmer et al. | .............. 370/252 |
| 6,480,901 B1 * | 11/2002 | Weber et al. | ................ 709/223 |
| 6,480,955 B1 * | 11/2002 | DeKoning et al. | |
| 6,493,751 B1 * | 12/2002 | Tate et al. | |
| 6,587,836 B1 * | 7/2003 | Ahlberg et al. | |
| 6,631,402 B1 * | 10/2003 | Devine et al. | |
| 6,636,503 B1 * | 10/2003 | Shiran et al. | |

* cited by examiner

*Primary Examiner*—Andrew Caldwell
*Assistant Examiner*—Stephan Willett
(74) *Attorney, Agent, or Firm*—Douglas W. Cameron; Anne Vachon Dougherty (57) ABSTRACT

A network system comprises: a WWW server 40 for executing a server process; a server 10 for providing a proxy server function; a client 20, which is connected to a communication network 30 for accessing the WWW server 40 and the server 10. The server 10 stores a Web file 11 that includes a proxy server function that can be displayed as a Web page by a Web browser, and that can be read and activated by the Web browser. The client 20 incorporates the Web browser that displays a Web page based on the Web file 11, which is downloaded from the server 10 via the communication network 30. When the Web file 11 is read by the Web browser, the proxy server function of the Web file 11 is initiated.

18 Claims, 10 Drawing Sheets

Comparison of proxy server function provision methods

| Method for implementing a proxy server function | Operating machine | Preparation by server | Preparation by client | Individual setup | Changing proxy setup |
|---|---|---|---|---|---|
| ① Install server | Server | * Installation<br>* Maintenance<br>* Activation of process | None | Not applicable | Manual |
| ② Provide using application | Client | None | * Installation<br>* Activation of process | Applicable | Manual |
| ③ Add to Web page (present invention) | Client | Register as contents | None | Applicable | Automatic |

CLIENT SERVER SYSTEM, SERVER, CLIENT, PROXY SERVER CONTROL METHOD, PROXY SERVER FUNCTION PROVISION METHOD, STORAGE MEDIUM AND PROGRAM TRANSMISSION APPARATUS

FIELD OF THE INVENTION

The present invention relates to a client/server system that employs an application to provide a proxy server function for a client.

BACKGROUND OF THE INVENTION

The original proxy servers, which functioned as proxies for clients desiring to access servers on the Internet as well as providing certain relay services, were used to establish firewalls for internal networks. Subsequently, however, following modifications that enabled them to anticipate client requests, proxy servers began to provide other services, such as prefetching, autopilot uses and caching, in addition to the proxy and relay functions. Thereafter, the services provided by proxy servers continued to be expanded, and presently, functions are available for adding data (embedding probes, virus checking, etc.) or for altering data (translation, summarization or changing an accent), for adjusting or deleting forms (deleting graphics, adjusting the number of colors, deleting inappropriate links, etc.), and for transmissions.

Eventually, as the available proxy server services grew ever more varied, it became difficult for a single server to satisfactorily perform all of the expected functions, and currently, instead of using only one server, networks tend to employ a plurality of servers and to distribute the various proxy server functions among them. Furthermore, especially since the development of the WWW (World Wide Web) portion of the Internet, it has become necessary for various proxy server functions employed by specific applications (e.g., the embedding of research probes in web pages, the embedding of Japanese or English translations, etc.) to be rapidly and effortlessly activated, and for the proxy servers affected to quickly and easily halt their operations after the functions have been performed.

In order to use proxy server functions for WWW-based applications, an user must employ to specify setup information of the proxy servers on the Web browsers. However, since special skills are required for such setups, and since some client machines are not authorized to perform such setup changes, it is not realistic to expect ordinary users of Web browsers to set up proxy servers. Therefore, conventionally, proxy servers can neither be rapidly and effortlessly activated, nor quickly and easily halted.

As is described above, currently, no means is provided whereby an ordinary client can employ proxy server functions while a simple switching function is being quickly performed. When a conventional proxy server, however, is to be employed to provide, at the least, the various functions described above, several means can be considered whereby a client can use the proxy server functions while freely switching between them. As an example of how this can be done, either all the required proxy servers can be operated by a single server machine, or the operation of a proxy server that is required to run a native application can be controlled by a client machine.

When all the required proxy server processes have been activated by a server, so long as the proxy setup performed with the Web browser was enabled by the client machine, the pertinent proxy functions can be employed immediately. However, as is described above, since special skills are required in order to employ a Web browser in this manner, this is not an easy task for an ordinary user.

When a specific proxy server process is not activated by a server, since some client machines are not authorized to activate a proxy server, all the proxy server processes that may be employed must be activated, regardless of whether the processes are actually used. In this case, however, since proxy servers are activated but are not actually employed, an extra load is imposed on the server. And furthermore, since the server is tasked with providing services for all clients that seek to employ the proxy server functions, and since, under the circumstances, it is prevented from performing a requested setup for each client, operational flexibility is reduced.

Further, when a proxy server that is required to run a native application is to be operated by a client machine, the pertinent application program must be loaded into the client machine. However, even after the application program has been loaded, the proxy setup must be changed, or must be returned to its initial state, each time use of the proxy server function is initiated or halted. As a result, a great deal of labor is required.

To resolve the above shortcomings, it is one object of the present invention to provide a simple operation for quickly initiating a proxy server function when it is required by a network application.

It is another object of the present invention to provide a simple operation for quickly returning a proxy server function to its initial state after performance of the pertinent function has been completed, so that the switching and the employment of the proxy server function can be easily and freely accomplished.

It is an additional object of the present invention to reduce the load imposed on a server to provide a proxy server, and to flexibly and quickly cope with a request for a new proxy server function.

SUMMARY OF THE INVENTION

To achieve the above objects, according to the present invention, a client/server system, wherein a network application based on the World Wide Web is run, comprises: a first server for performing a server process; a second server for providing a proxy server function; and a client that is connected to a communication network in order to access the first server and the second server, wherein stored in the second server is a Web page program for a proxy server function that uses a Web browser to display a Web page and that is activated when read by the Web browser, and wherein incorporated in the client is a Web browser that is used to display a Web page based on the Web page program downloaded from the second server via the communication network, and that is used to read the Web page program and to activate the proxy server function of the Web page program.

Further, the Web page program includes a proxy server program for implementing the proxy server function, and page data consisting of the Web page displayed by the Web browser of the client, and including a function for activating the proxy server program when the proxy server program is read by the Web browser. This is preferable because the proxy server function can be implemented by displaying a Web page using a Web browser, i.e., by using a simple operation to open a new window for the Web page. Only the proxy server program need be installed to enable the client machine to perform TCP/IP socket communication while the program is being operated by the Web browser, and there is no specific installation procedure.

Furthermore, only the function included in the page data for activating the proxy server program need be implemented by a plug-in function or an ActiveX control, or by using an event handler for a Web page and script language, and for this implementation also there is no specific procedure.

In addition, the page data also includes a function for, before the proxy server program is activated, changing the proxy setup performed with the Web browser belonging to the client into a setup that is appropriate for the operation of the proxy server program. This is preferable because then a user need not perform a complex processing procedure in order to use the Web browser to set the proxy server.

The present invention can be applied not only as the above client/server system, but also as a server, a client or another form.

Specifically, according to the invention, a server constituting a client/server system comprises: a connector, which is connected to a communication network, for accepting an access request from a client; and a storage unit for storing a Web page program, which is provided upon receipt of the access request from the client via the connector, that includes a proxy server function, that can display a Web page using a Web browser, and that is activated when read using the Web browser.

The storage unit stores the Web page program as contents corresponding to the World Wide Web. And thus, the server need not install the Web page program and activate it on the server. Therefore, since the client can download the Web page program by performing the same operation as is normally used to access a homepage, the load imposed on the server can be reduced.

Further, according to the present invention, a client constituting a client/server system comprises: a contents display unit for using a Web browser to display, as a Web page, contents that are provided through a server process; and a proxy server function execution unit for reading, to the Web browser, a Web page program that includes a proxy server function, for displaying the Web page based on the Web page program, and for executing the proxy server function included in the Web page program.

When the Web page program is read into the Web browser, the proxy server function execution unit changes the proxy setup performed with the Web browser, so that upon receipt of a request issued by the contents display unit, or for a reply to be transmitted to the contents display unit, a process performed by the proxy server function is initiated via the Web page program. This is preferable because then a user need not perform a complex processing procedure in order to use the Web browser to set the proxy server.

A process during which, using the Web browser, the contents display unit displays a Web page is the same as a process during which, based on the Web page program, the proxy server function execution unit displays a Web page. With this arrangement, a user can perform the same operation as is normally used to access a homepage, and can open a Web page window and activate the proxy server function without being aware that the Web page is based on a Web page program that includes a proxy server function.

According to the present invention, a proxy server control method for activating and halting a proxy server comprises the steps of: loading a Web page program that includes a proxy server function for displaying a Web page using a Web browser, and that is activated when read using the Web browser; changing the proxy setup performed with the Web browser, so that as a request for a server process, or as a response to a reply from the server process, a process using the proxy server function is initiated via the Web page program; and using the Web browser to display the Web page based on the Web page program.

The proxy server control method further comprises the steps of: storing an original proxy setup provided for the Web browser before the proxy setup is changed; and replacing an altered proxy setup provided for the Web browser with the originally provided proxy setup before the Web page displayed by the Web browser is closed. This is preferable because when the use of the proxy server function provided by the Web page program is terminated, a user need not perform any complex processing to return the proxy setup provided for the Web browser to its original state.

Further, according to the present invention, a proxy server function provision method, for a client/server system wherein a network application based on the World Wide Web is operated, comprises the steps of: uploading, to a server, a Web page program having a proxy server function that can display a Web page using a Web browser, and that is read and activated using the Web browser; downloading the Web page program from the server to an arbitrary client; reading the Web page program into the Web browser and displaying a Web page; and activating the proxy server function. Since a Web page program includes a proxy server function, so long as a Web page program having a desired proxy server function (e.g., a function for preparing a Web page customized by a specific user) is uploaded, regardless of access rights, a client machine wherein the Web browser is installed can freely download the Web page program and employ the proxy server function (in the above example, can read a Web page customized for his or her own use).

In addition, according to the present invention, provided is a storage medium on which input means for a computer stores a computer-readable program, the program comprising: a proxy server program for implementing a proxy server function; and page data that consists of a Web page displayed by a Web browser, and that has a function for activating the proxy server program when the page data are read into the Web browser. Any type of storage medium, such as a CD-ROM or a floppy disk, can be employed, including a medium on which software is stored and sold.

Furthermore, according to the present invention, provided is a storage medium on which input means for a computer stores a computer-readable program, the program permitting the computer to perform: a process using a proxy server function to submit a request to a server process and to receive a reply from the server process; and a process for changing a proxy setup for a Web browser, so that the process using the proxy server function is initiated to submit a request, originating at a Web page displayed by the Web browser, to the server process and to receive a reply from the server process. This is an excellent use of a storage medium because a user need not perform any complex processing associated with the proxy setup for the Web browser. As is stated above, any type of storage medium can be employed.

When the present invention is applied for a program transmission apparatus, the program transmission apparatus comprises: storage means for storing a Web page program having a proxy server function that can use a Web browser to display a Web page and that is read and activated by the Web browser; and transmission means for reading the Web page program from the storage means and for transmitting the Web page program. With this program transmission apparatus, the present invention can be provided for a client without a program storage medium, such as a CD-ROM, being required.

BRIEF DESCRIPTION OF THE DRAWINGS

The present invention will now be described in detail by referring to the preferred embodiment shown in the accompanying drawings wherein.

DETAILED DESCRIPTION OF THE INVENTION

Figure 1:
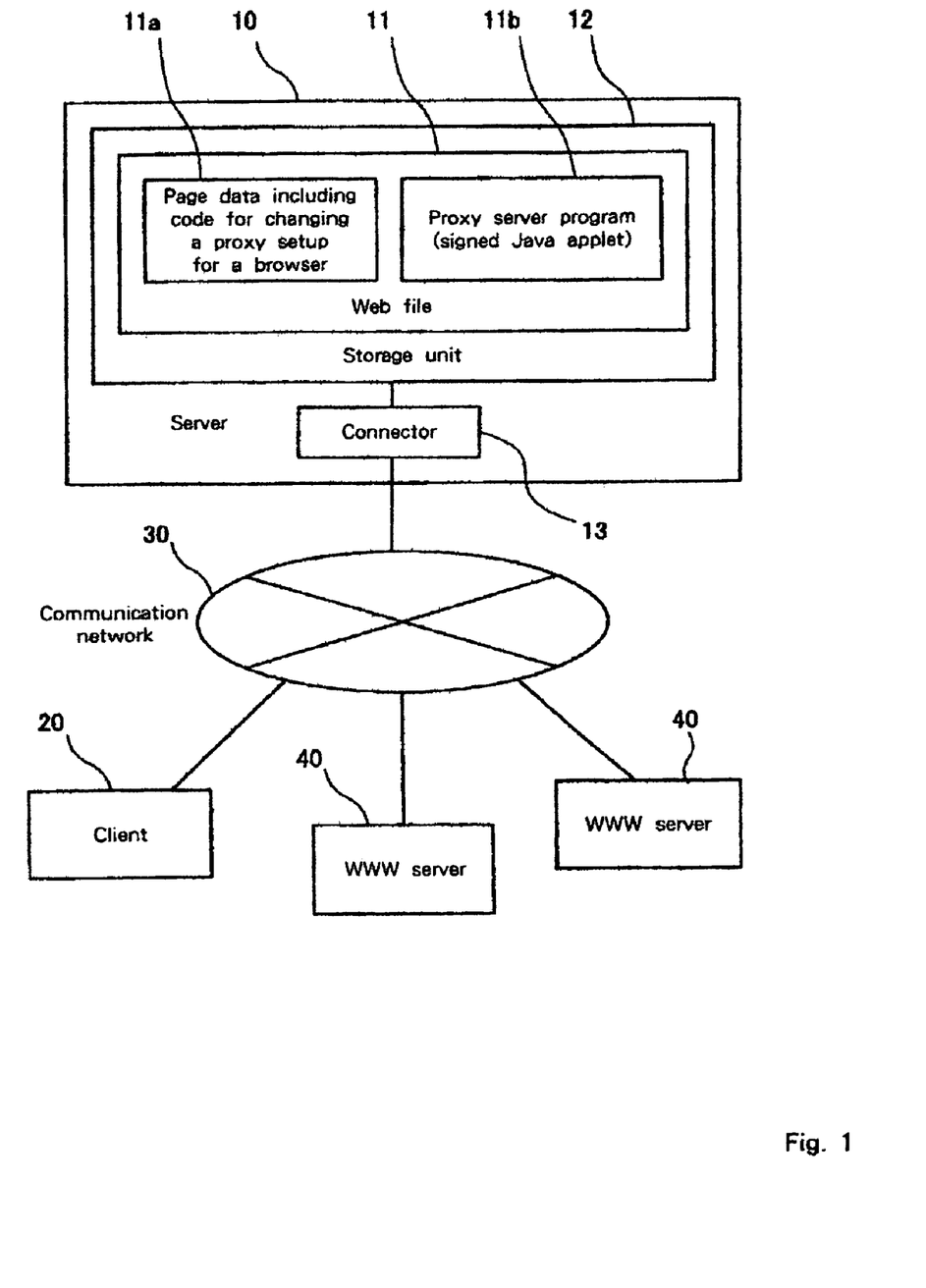
FIG. 1 is a diagram for explaining the overall configuration of a client/server system according to one embodiment of the present invention.

FIG. 1 is a diagram for explaining the overall arrangement of a client/server system according to one embodiment of the present invention. A WWW (World Wide Web) server 10 comprises a connector 13 to be connected to a network 30 and a storage unit 12 for storing a program. A Web file 11 that includes a proxy server function is stored in the storage unit 12 as WWW contents. A client 20 can download the Web file 11 from the server 10, and can employ a Web browser to display the contents. Thus, the Web browser can be used as an environment for the execution of a proxy server. The network 30 is, for example, an intranet or the Internet, and connects the server 10 and the client 20. The network 30 may be a Wide Area Network, or a Local Area Network, or it may be a publicly available network like the Internet or a network for which access rights are limited.

Further, whether a firewall is implemented for the network 30 is disregarded. A WWW server 40 stores common WWW material (homepages, etc.).

As is shown in FIG. 1, the Web file 11 stored in the server 10 is composed of page data 11a that are displayed as a Web page using a Web browser and a proxy server program 11b that provides a pertinent proxy server function. The page data 11a are written, for example, in the HTML language. The contents of the page data 11a are not particularly limited, and a message that the pertinent page provides a proxy server function, or the contents of the function, may be displayed.

Means for handling HTTP protocol is required to execute the proxy server program 11b. Therefore, this program is so installed that it permits a client machine to perform TCP/IP socket communication while a program is being executed by the Web browser. Specifically, the proxy server program 11b can be prepared as a Java applet, an ActiveX control, or a plug-in. It should be noted, however, that when a Java applet is employed, the proxy server program 11b must not be prepared as a simple applet but as a signed applet because of limitations imposed by security. This occurs because since a common Java applet has code base limitations, a machine using an applet can communicate only with another machine that has downloaded the pertinent applet. If a signed applet is employed, however, this limitation is eliminated. Hereinafter in the embodiment, a proxy server program 11b is employed that was prepared using the Java applet.

When the pertinent Web page is to be displayed by the Web browser, the proxy setup for the Web browser is changed to a state that is appropriate for the use of the proxy server function of the proxy server program 11b of the Web file 11. Further, the Web file 11 includes a function for activating the proxy server function 11b, and for returning the proxy setup for the Web browser to its original state when the pertinent Web page is abandoned. This function can be provided for the page data 11a by using a plug-in or an ActiveX control, or by using an event handler for a Web page and a script language (Java Script). Script code for changing the proxy setup for the Web browser is added to the page data 11a of the Web file 11 in FIG. 1. In this case, the script is so written that the proxy server program 11b is activated by performing a required proxy setup using a handler function that is called at the same time the downloading is completed, and that the proxy setup is returned to its original state using a handler function that is called when the Web page is closed. A detailed explanation will be given later for the operation that is based on this function.

The thus structured Web file 11, as well as a common homepage, is uploaded to the server 10 and is stored in consonance with its WWW contents. The client 20 can access the server 10 to download the Web file 11 via the HTTP in the same manner as for normal WWW contents, and can display the page data 11a as a Web page using the Web browser belonging to the client 20. Thus, according to the above individual functions, the proxy server function of the proxy server program 11b can be employed using the Web browser. That is, the server 10 serves as a general WWW server for the client 20, and does not include the proxy server function. The Web file 11, which includes the proxy server program 11b, serves as WWW contents, and is downloaded from the server 10, using HTTP, by the client 20. Thus, even when the client 20 is inside a firewall, so long as the client can read the Web page of the page data 11a, the client can employ, through the firewall, the proxy server function of the proxy server program 11b. When a new proxy server function is to be provided, only a Web file 11 that includes the proxy server program 11b and the pertinent function must be prepared and uploaded to the server 10.

Figure 2:
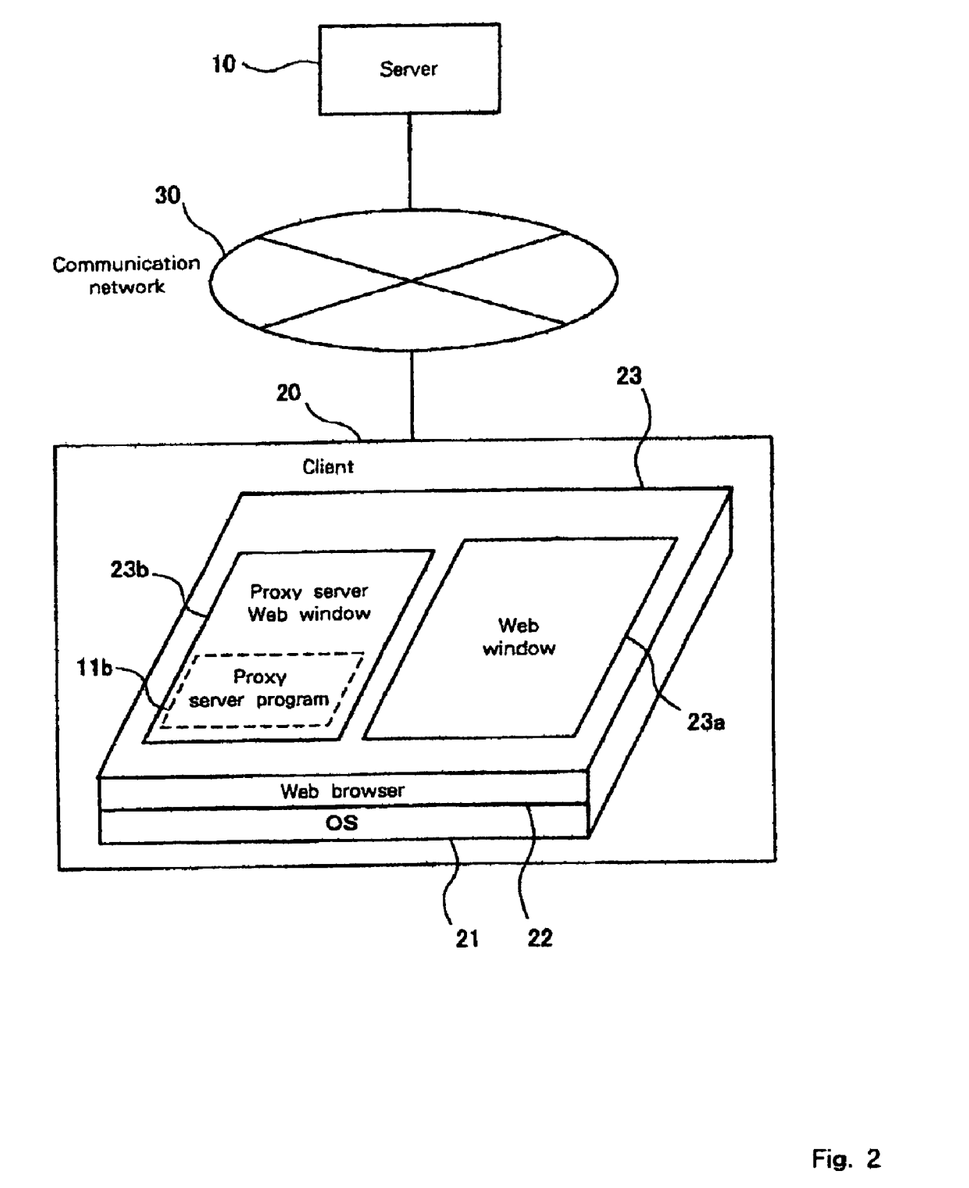
FIG. 2 is a diagram for explaining the arrangement of an environment wherein a client 20 executes a proxy server function.

FIG. 2 is a diagram for explaining the configuration of an environment wherein the client 20 executes the proxy server function. An operating system (OS) 21 is operated by the client 20 and a Web browser 22 is operated by the operating system 21. The Web browser 22 opens a window (hereinafter referred to as a Web window) to display a Web page on a display screen 23 of the client 20. Various WWW contents are provided across a network, such as the Internet, or via various media, such as CD-ROMs, and are displayed as Web pages in the Web window. Therefore, when the client 20 is connected to the server 10 across the network 30 and downloads the Web file 11, which is stored in the server 10 and which includes a proxy server function, the Web browser 22 can substantially display, on the display screen 23, the page data 11a as well as other ordinary Web pages.

When the proxy server function is actually employed, as is shown in FIG. 2, two types of Web windows are displayed: a Web window 23a, for displaying the common contents for which the proxy server function is employed, and a Web window 23b, for a proxy server for displaying the page data 11a included in the Web file 11 that was downloaded from the server 10. As is described above, when the Web file 11 is read by the Web browser 22, it activates the proxy server program 11b and displays a Web page for the page data 11a. Therefore, in the Web window 23a, a user opens a new Web window 23a in which predetermined contents are displayed, and at the same time, by, for example, clicking on a link button, displays a Web page for the page data 11a included in the Web file. As a result, the proxy server program 11b can be activated and a required proxy setup for the Web browser 22 can be automatically effected.

Figure 3:
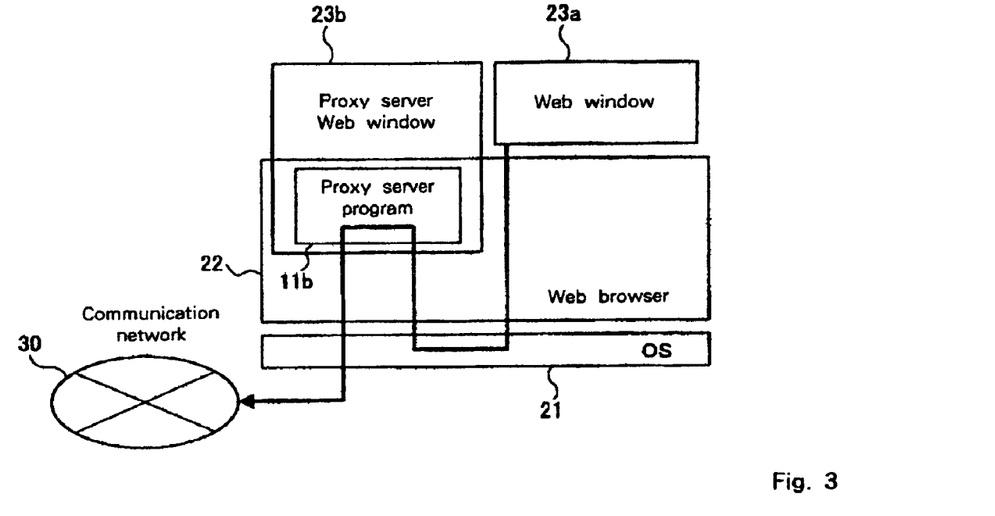
FIG. 3 is a diagram for explaining the transmission of an HTTP request when the proxy server function is initiated.
Figure 4:
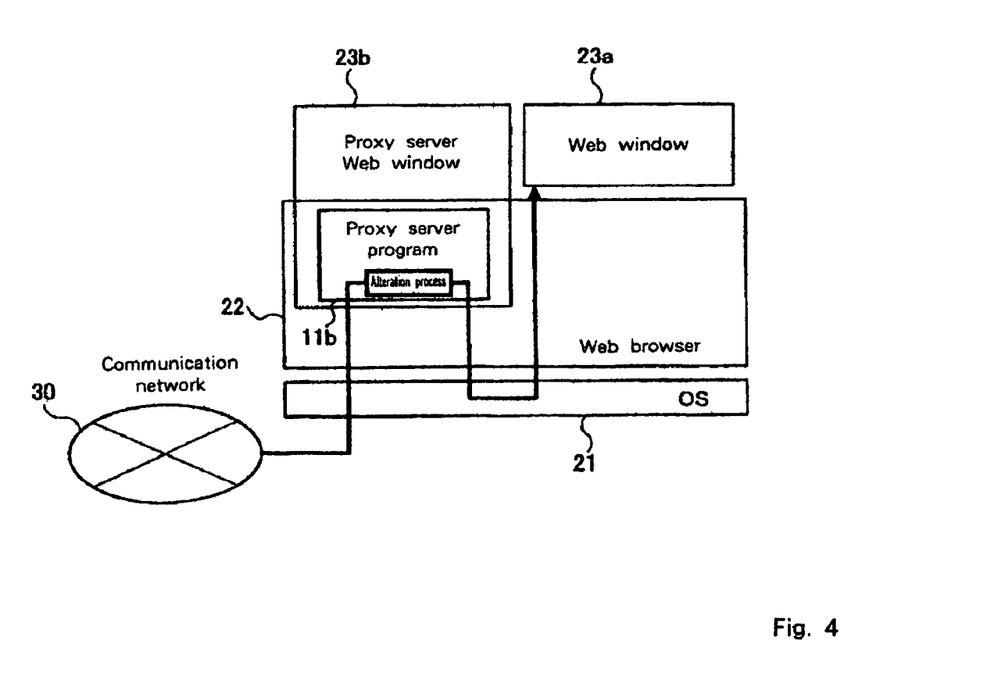
FIG. 4 is a diagram for explaining the transmission of an HTTP reply after the employment proxy server function has begun.

FIG. 3 is a diagram for explaining the transmission of an HTTP request while the general Web window 23a and the proxy server Web window 23b are displayed on the screen 23 of the client 20, as is shown in FIG. 2. FIG. 4 is a diagram for explaining the transmission of an HTTP reply while the general Web window 23a and the proxy server Web window 23b are displayed on the screen 23 of the client 20, as is shown in FIG. 2. By using the function included in the Web file 11, the proxy server program 11b included in the Web file 11 is executed while the proxy server Web window 23b is open. It should be noted that the contents of a Web file 11 that is stored in another server connected via the network 30 are displayed on the Web window 23a.

As is described above, the function employed to change the proxy setup for the Web browser 22 to a state that is appropriate for the use of the proxy server function contained in the proxy server program 11b is included in the page data 11a in the Web file 11. Specifically, the function sets an appropriate state wherein an operation entered by a user by employing a Web page displayed in the Web window 23a, i.e., the HTTP request and the HTTP replay that constitute exchanges of the contents provided by the general WWW server, are transmitted through the proxy server program 11b. When as a result of the change in the proxy setup an HTTP request originating at the Web window 23a is issued, the HTTP request is transmitted first to the proxy server program 11b that is embedded in the proxy server Web window 23b and then to the network 30. Similarly, when the reply to the HTTP request is transmitted by the server, via the network 30, to the client 20, the HTTP reply is first transmitted to the proxy server program 11b embedded in the proxy server Web window 23b. When the process using the proxy server function is performed in response to the HTTP reply, the resultant reply is displayed in the Web window 23a.

Figure 7:
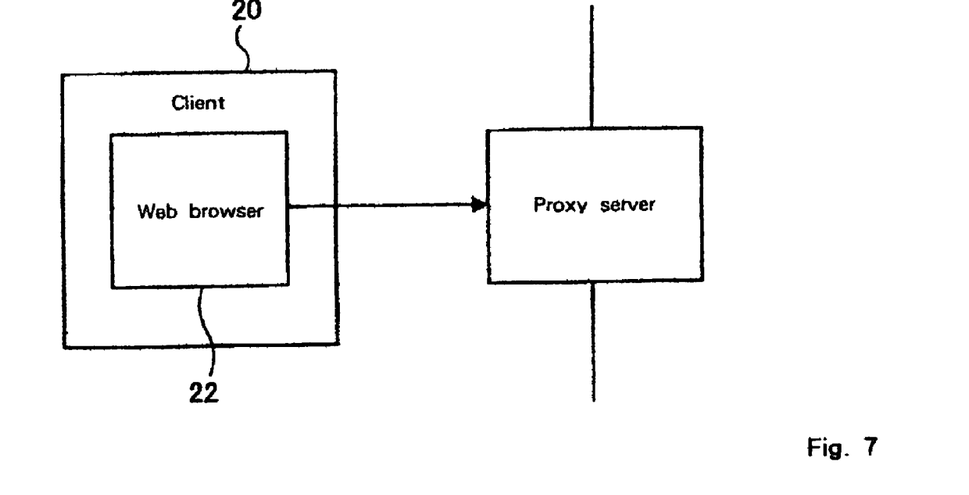
FIG. 7 is a diagram for explaining the state when a predetermined proxy setup has been performed for a Web browser 22.
Figure 8:
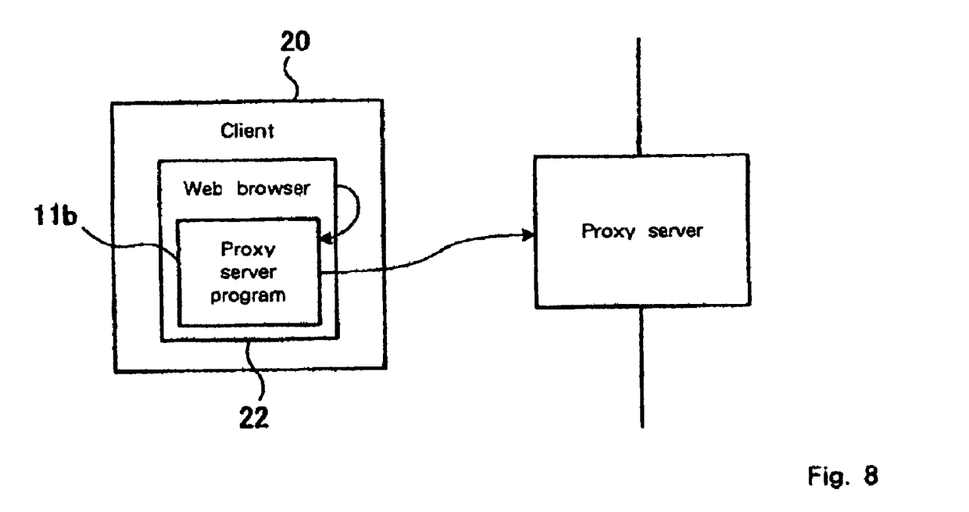
FIG. 8 is a diagram for explaining the contents of a proxy setup required when employment of the proxy server function is begun using the Web file 11 in the state shown in FIG. 7.

Since the proxy server function is provided by the proxy server program 11b, the various functions that can be provided by a conventional proxy server can be prepared in accordance with the contents of the program. These functions are, for example, a function for prefetching, for performing an auto-pilot function or for performing caching by anticipating a request, a function for filtering by intercepting the contents, i.e., for adding contents (embedding a probe, virus checking, etc.) or changing contents (translating, summarizing, changing an accent, etc.), and a function for adjusting or deleting forms (for deleting graphics, for adjusting the number of colors, for deleting an inappropriate link, etc.). Further, in some cases the proxy setup state of the Web browser 22 is established as a specific state before the Web file 11 is read into the Web browser 22. While in other cases the specific proxy setup state must be echoed to change the proxy setup using the page data 11a in the Web file 11. Such a case corresponds, for example, to one where a service is accepted from a different proxy server, as in a case shown in FIG. 7 where the client 20 is inside a firewall. In this example, as is shown in FIG. 8, a process performed by the proxy server program 11b of the Web file 11 must be inserted between the operation originating at the Web window 23a and a process performed by the different, pertinent proxy server. That is, the HTTP request is processed by the proxy server program 22b, and then the resultant request is transmitted by the pertinent proxy server to the target WWW server. The HTTP request returned by the WWW server is processed by the pertinent proxy server, and the resultant request is transmitted, via the proxy server program 11b, to the Web browser 22.

Figure 5:
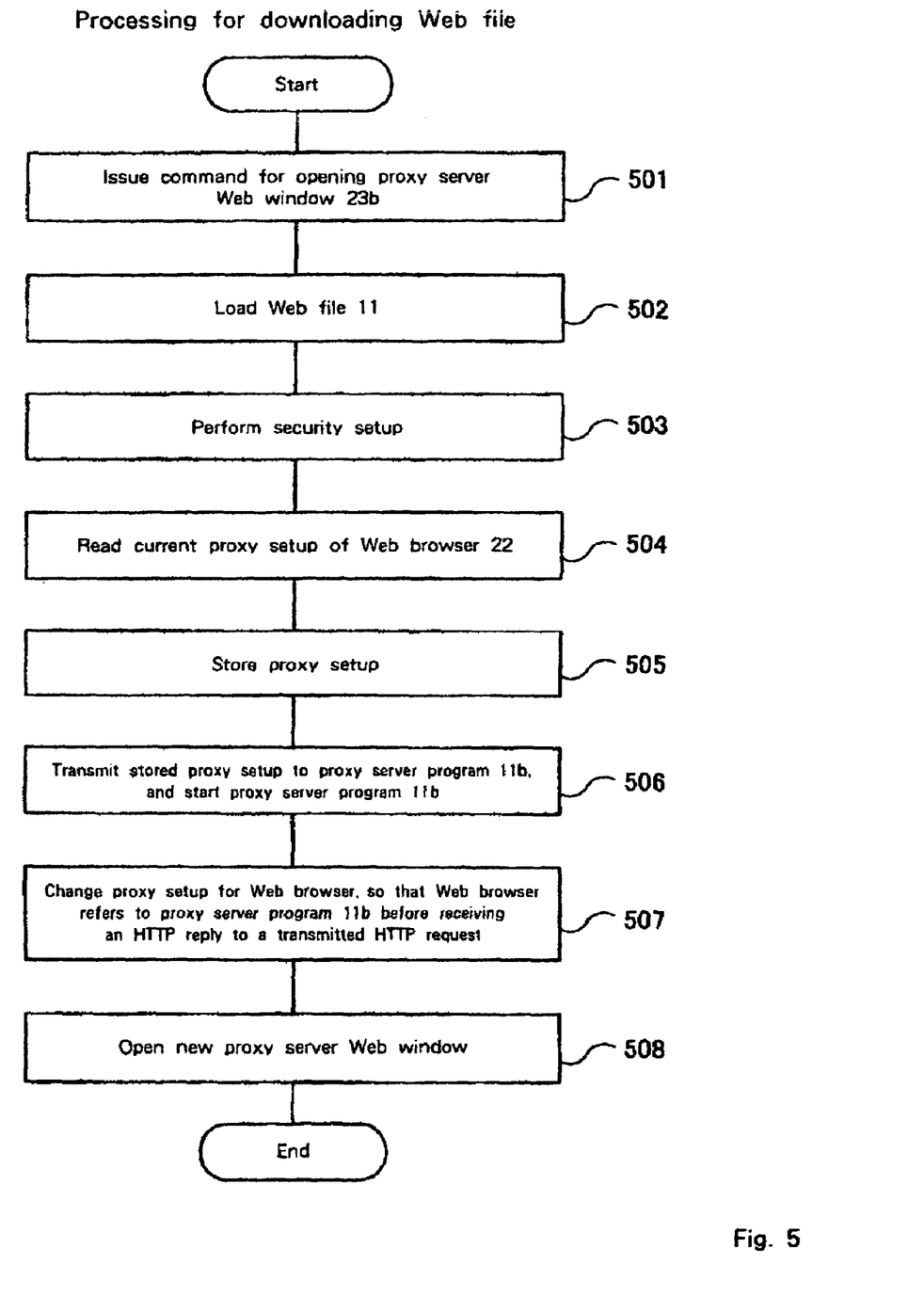
FIG. 5 is a flowchart for explaining the processing performed by the client 20 when downloading a Web file 11.

The processing for downloading the Web file 11 from the server 10 to the client 20 will now be described while referring to the flowchart in FIG. 5.

First, a command is issued to open the proxy server web window 23b (block 501). As is described above, the command may be issued in response to a user clicking on a link button in the same manner as was used to open the Web window 23a for common contents, or it may be issued automatically by an interaction with the function of an application program (e.g., the command will be issued automatically when specific contents are displayed in the Web window 23a). Then, the Web file 11 is loaded in accordance with the issuance of the command (block 502), and the security setup is performed in order to read various setups for the Web browser 22 (block 503). The current proxy setup for the Web browser 22 is read (block 504) and is stored (block 505). Following this, the proxy setup is transmitted to the proxy server program 11b to activate the program 11b (block 506). The reason the proxy setup is transmitted to the proxy server program 11b is that if the proxy setup has been performed before the Web file 11 is read, this setup is not ignored and is echoed in the operation of the proxy server program 11b. The proxy setup for the Web browser 22 is changed, so that the Web browser 22 refers to the proxy server program 11b before it receives a reply to an HTTP request that is output (block 507). Finally, a new proxy server Web window 23b is opened (block 508).

Through the above processing, the procedures extending from the security setup at block 503 to the proxy setup change at block 507 are implemented by using a script added to the page data 11a of the Web file 11 or by a plug-in or an ActiveX control. Specifically, when Java script is employed, the function for the performance of the above processing is added to the Java Script function that is called by an On Load event handler.

Figure 6:
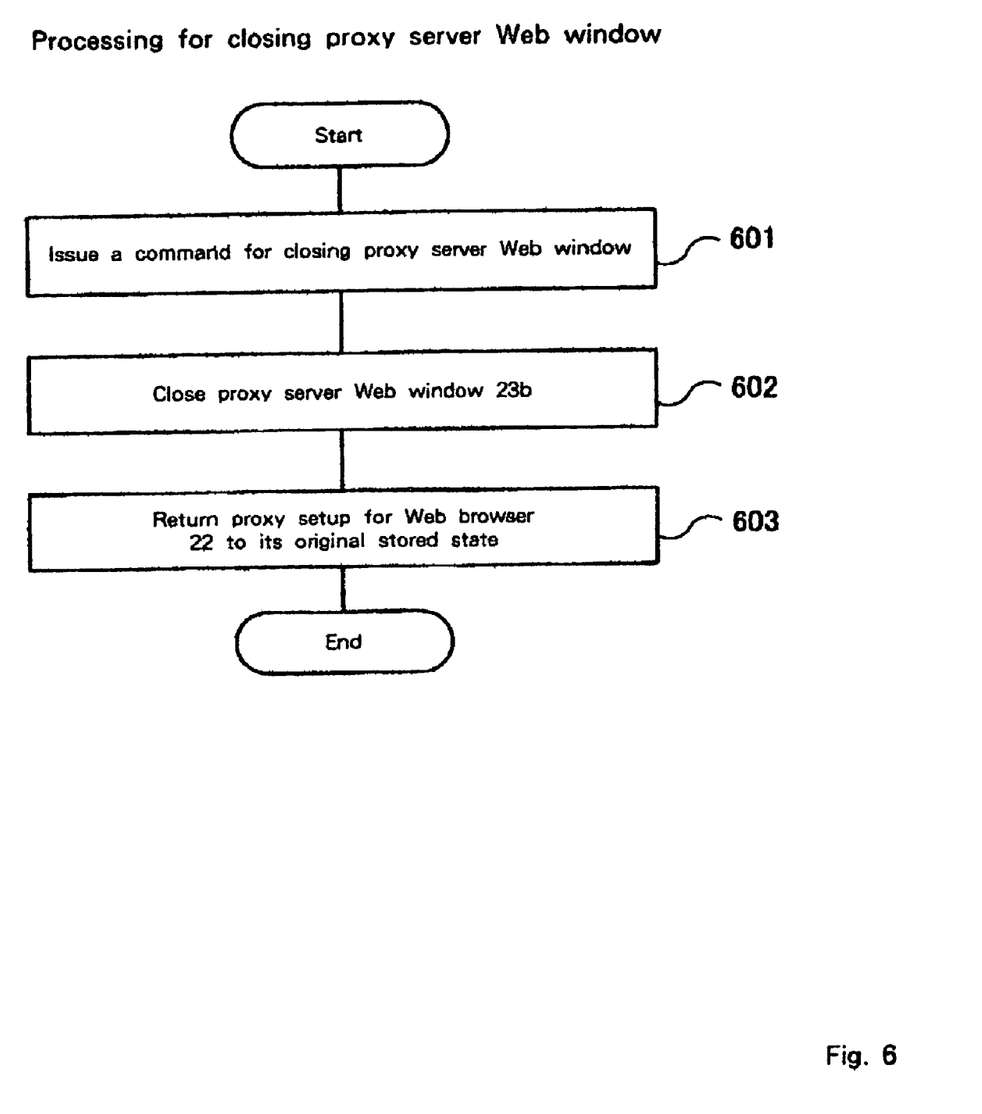
FIG. 6 is a flowchart for explaining the processing performed by the client 20 when closing a proxy server Web window 23b.

The processing for closing the proxy server Web window 23b will now be described while referring to the flowchart in FIG. 6. First, a command is issued to close the proxy server Web window 23b (block 601). As well as the above command for opening the proxy server Web window 23b, the command may be issued in the same manner as when a user closes the Web window 23a for normal contents or another window, or may be automatically issued by interacting with an application program (for example, the command may be issued automatically when the Web window 23a, for which the proxy server function of the proxy server program 11b is employed, is closed). Then, as the command is issued, the proxy server Web window 23b is closed (block 602), and the proxy setup for the Web browser 22 is returned to the state that was stored at block 505 in FIG. 5 (block 603).

Through the above processing, the recovery of the proxy setup at block 603 is implemented by using a script that is added to the page data 11a of the Web file 11, or by using a plug-in or an ActiveX control. Specifically, when Java script is employed, the function for performing the above processing is added to the Java Script function that is called by an On Unload event handler.

As is described above, the Web file 11 that is downloaded from the server 10 to the client 20 has a form wherein a function is added to a page written in the HTML language by a Java applet, an ActiveX control or a plug-in. Therefore, the Web browser 22 of the client 20 displays the page data 11a of the Web file 11 in the same manner as it would display a common homepage. That is, the process for displaying the Web window 23a using the Web browser 22 is the same as the process for displaying the proxy server Web window 23b. Therefore, a user need only perform a simple operation, i.e., open the proxy server Web window 23a in the same manner as is used to display a common homepage, so that the user can automatically employ the proxy server function to activate the proxy server program 11b and to perform a required proxy setup, and so that the user need not perform any complex processing for a complex proxy setup. Similarly, the user need only perform a simple operation, i.e., close the proxy server Web window 23b, so that the proxy setup that was changed when the proxy server program 11b was activated is automatically returned to its original state, and so that the user need not perform any complex processing. Further, since the proxy server program 11b in the Web file 11, whose page data 11a are displayed in the proxy server Web window 23b, was activated, the proxy server function that is to be employed can be easily changed by switching the page data 11a that is to be displayed in the proxy server Web window 23b.

Figure 9:
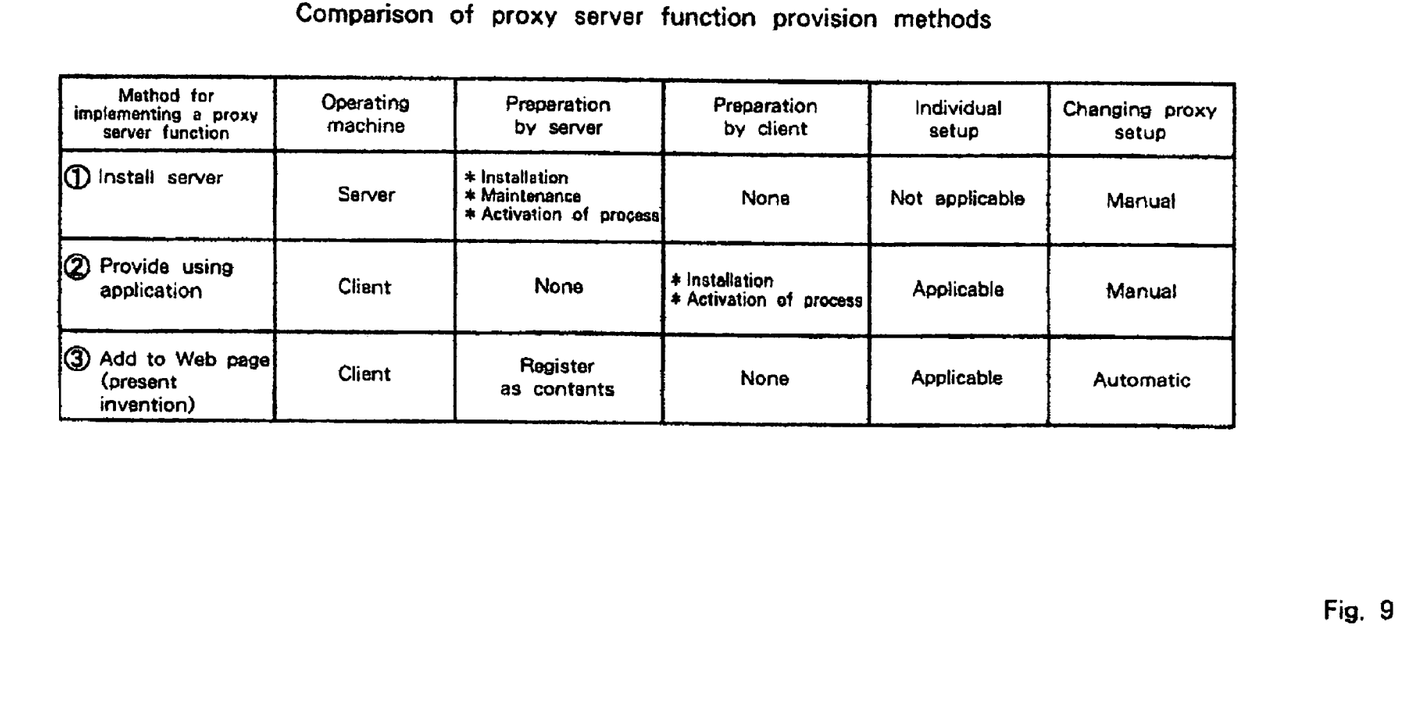
FIG. 9 is a diagram showing a comparison of the methods used for providing a proxy server function.

FIG. 9 is a table for comparing, as methods for providing a proxy server function, (1) a method for employing a server to prepare a proxy server, (2) a method for employing a client to operate a proxy server that is required for a native application, and (3) a method for providing a proxy server function using the Web file 11. As is apparent from FIG. 9, since the method (3) is employed for this embodiment and the Web file 11 is registered as the WWW contents for the server 10, the server does not have to perform installation and maintenance, and to activate the proxy server process that uses the proxy server function. Further, since the proxy server is activated by a client, the setup for each client is enabled. Further, if the client includes the Web browser, the proxy server function can be employed. Therefore, the application of the proxy server required for the client need not be installed each time, or the proxy server process need not be activated. In addition, according to this embodiment, the proxy setup for the client is automatically changed as the Web file 11 is downloaded, and no complex processing is required.

Figure 10:
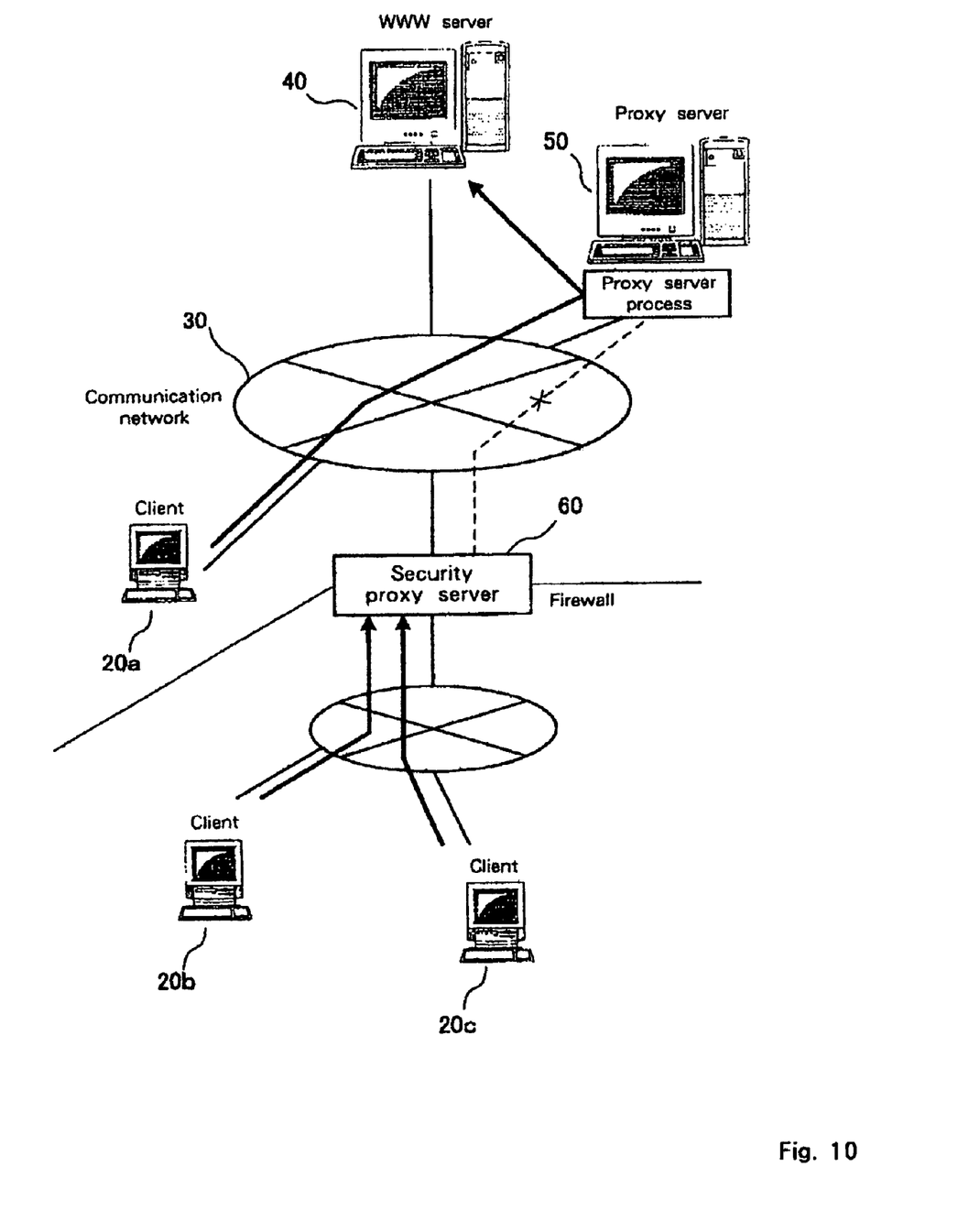
FIG. 10 is a diagram showing a conventional proxy server to explain the use of a proxy server when a firewall has been established for a network.
Figure 11:
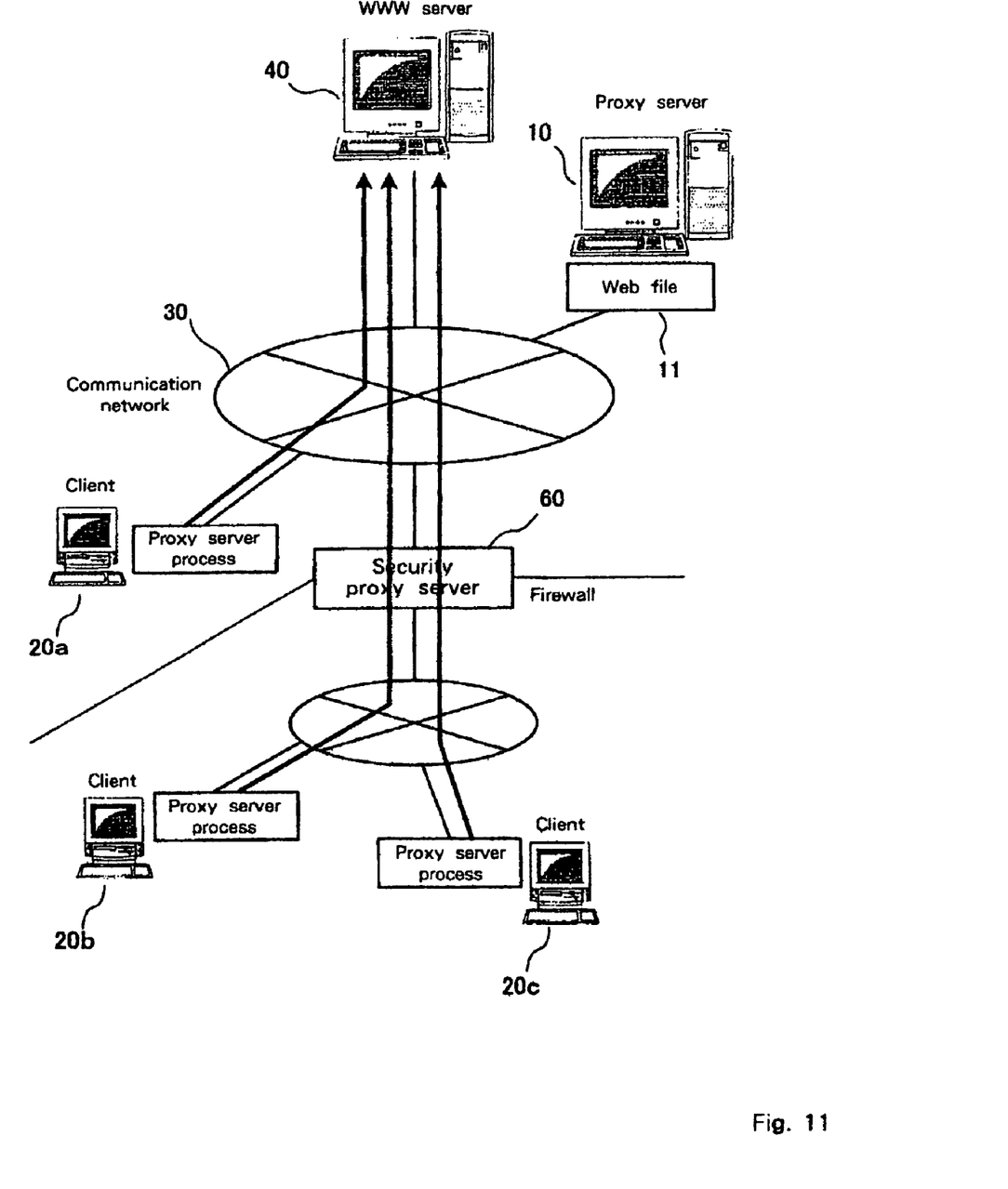
FIG. 11 is a diagram for explaining the use of a proxy server according to the embodiment when a firewall has been established for a network.

FIGS. 10 and 11 are diagrams for explaining an example network system that comprises the components of the invention. In the network system in FIG. 10, a WWW server 40, a conventional proxy server 50 and clients 20a to 20c are connected to a network 30. The clients 20b and 20c are located inside a firewall that is established by a security proxy server 60, and are connected to the network 30 via the proxy server 60. It should be noted that the proxy server 60 has not been granted the right to access the proxy server 50. In this example, to access the WWW contents on the WWW server 40, the client 20a can employ a function that is provided by the proxy server 50. However, the clients 20a and 20c can not employ the function provided by the proxy server 50, because the proxy server 60 has not been granted the right to access the proxy server 50.

In the network system shown in FIG. 11, a WWW server 40, a server 10 and clients 20a to 20c are connected to a network 30. As in FIG. 10, the clients 20b and 20c are located inside a firewall that is established by a security proxy server 60, and are connected to the network 30 via the proxy server 60. The server 10, which is the same kind of WWW server as the WWW server 40, stores a Web file 11 having a proxy server function. In this example, since the server 10 is a WWW server, the clients 20b and 20c can access this server 10, and can download the Web file 11 from the server 10 and employ the proxy server function. That is, while the restriction imposed by security is maintained, the proxy server function can be provided through the firewall.

Figure 12:
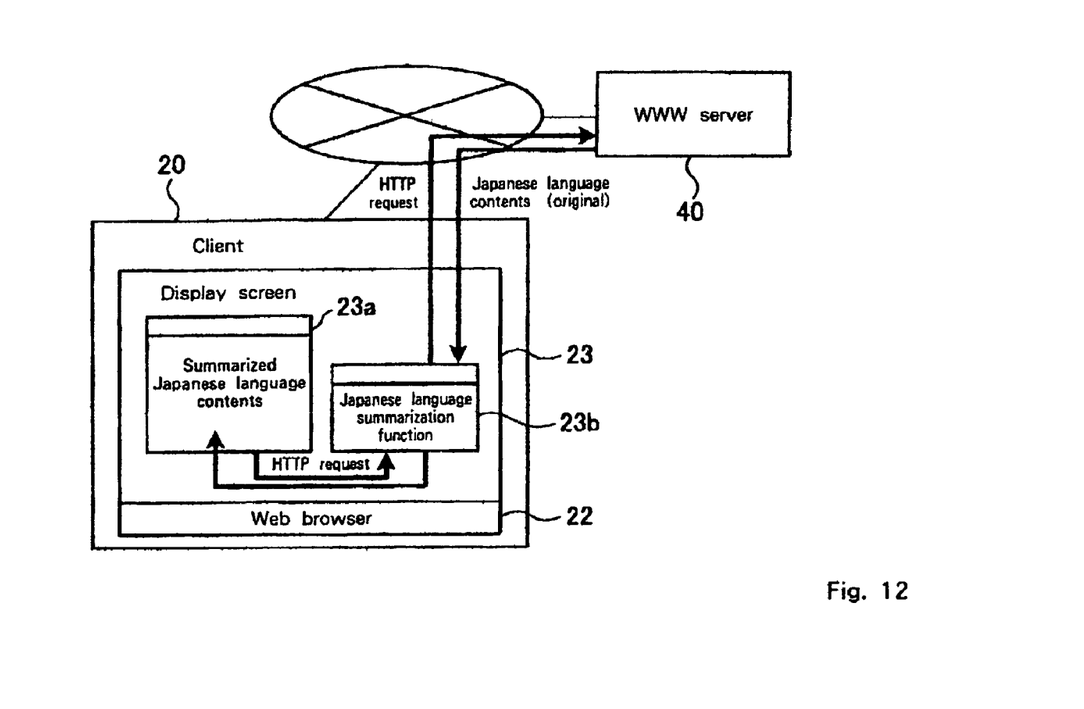
FIG. 12 is a diagram for explaining a specific example for this embodiment where a Web page is opened for providing a proxy function for Japanese language summarization.
Figure 13:
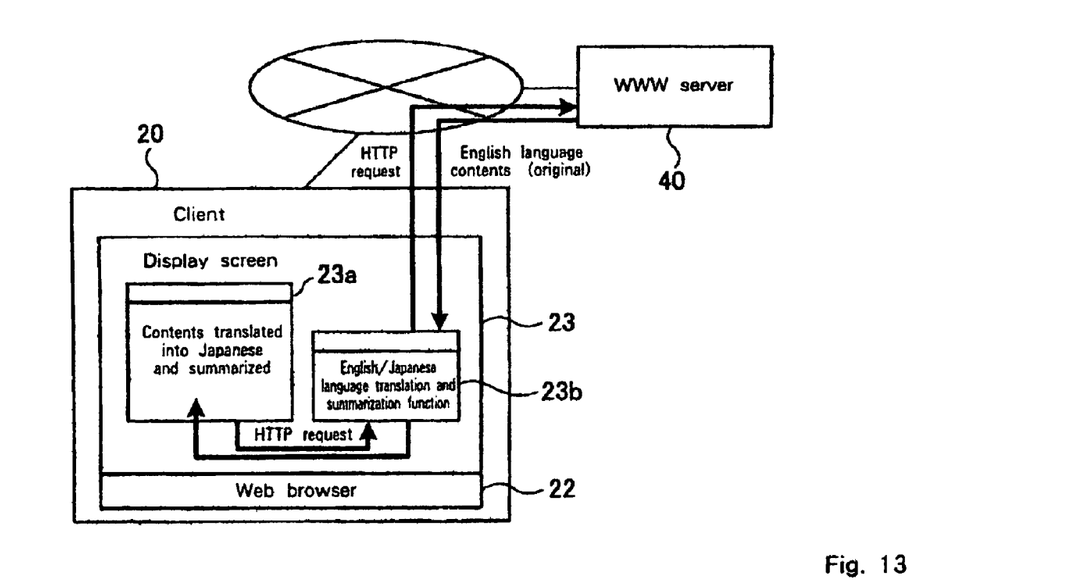
FIG. 13 is a diagram for explaining a specific example for this embodiment where a Web page is opened for providing a proxy function for English/Japanese language translation and summarization.

FIGS. 12 and 13 are diagrams for explaining specific examples for this embodiment. In FIG. 12, the Web file 11 has already been downloaded from the server 10 to the client 20, and the proxy server Web window 23b has been displayed by the Web browser 22 to enable the use of a proxy function for summarizing Japanese sentences. Further, the Web window 23a is displayed to represent the WWW contents (Japanese language contents) that are stored in the WWW server 40. In this state, an HTTP request is issued by manipulating the Web window 23a, and as is shown in FIG. 13, the request is transmitted to the WWW server 40, via the proxy server program 11b, for the Japanese language summarization that is associated with the proxy server Web window 23b. The Japanese language contents of the WWW server 40 are transmitted via the proxy server program 11b that is associated with the proxy server Web window 23b, and the summarized contents are displayed in the Web window 23a.

Assume that a user has accessed a desired English language site by referring to the headlines provided for summarized Japanese language contents. In accordance with the conditions of the access, as is shown in FIG. 13, a web page for a Web file 11 that includes a proxy server function for a service for translating entries at an English language site into Japanese, and for summarizing the translation is displayed in the proxy server window 23b, in which a Web page is displayed for a Web file 11 having a proxy server function for performing Japanese language summarizations. Thus, the proxy server function can be changed. Therefore, an HTTP request, which is issued by manipulating the Web window 23a, is transmitted to the WWW server 40 via the proxy server program 11b, which is used for English/Japanese language translation and summarization, that is associated with the proxy server Web window 23b. The English language contents in the WWW server 40 are translated, to provide a Japanese language summary, by the proxy server program 11b, which is used for English/Japanese language translation and summarization, that is associated with the proxy server Web window 23b. Finally, the Japanese language summary is displayed in the Web window 23a.

In order to read the Japanese language translation of all the English language contents, a Web page for a Web file 11, which has a proxy server function for a service for translating entries at an English language site into Japanese, is displayed in the proxy server Web window 23b in which a Web page for a Web file 11 that has a proxy server function for English/Japanese language translation and summarization is displayed. Therefore, the proxy server function to be used is changed, and the Japanese language translation of all the English language contents is displayed in the Web window 23a.

Another specific example for this embodiment will now be described. Assume that a specific user employs a desired proxy server while he or she is absent from a work area. Since the computer of an associate of the user may not always have access rights for a conventional proxy server, the user must carry a computer in which the pertinent proxy server is installed in order that he or she can use it, regardless of the existing circumstances. Further, even if the computer of the associate has access rights for the proxy server, the user must perform a complex proxy setup process in order to use the proxy server.

In this embodiment, however, as is described above, since the Web file 11 is downloaded from the server 10 to the client 20 by employing HTTP, a client machine on which a Web browser is mounted can freely employ a proxy server function provided by the Web file 11. Further, since today Web browsers are generally installed in computers, most computers can employ proxy server functions. If, by taking advantage of these capabilities, a user uploads and registers, on the server 10, a Web file 11 having a unique proxy server function, such as the preparation of a customized Web page, the user can freely employ the proxy server function using an arbitrary computer without having to take access rights into consideration, and can read the customized Web page.

As is described above, according to the present invention, when a network application requires a proxy server function, it can be employed quickly by performing a simple operation. And when the use of the proxy server function is no longer required, the function can be quickly returned to its original state by performing a second simple operation. Thus, proxy server functions that are employed can be freely and easily changed.

The load imposed on a server in order to provide a proxy server function can be reduced, and the provision of a new proxy server function can be flexibly and quickly effected.

The invention has been described with reference to several specific embodiments. One having skill in the relevant art will recognize that modifications may be made without departing from the spirit and scope of the invention as set forth in the appended claims.

The invention claimed is:

1. A distributed network system for running a Web-based application at a client, comprising:
   a first server for performing a server process;
   a second server for providing a proxy server function and for dynamically downloading a Web file to a client automatically in response to a client request for a Web page, said Web file comprising a Web page program for the proxy server function that is activated at said client when read by a Web browser, and
   a client computer, capable of running said Web-based application without having to store, maintain, and configure proxy server functions at said client, comprising a connection to a communication network for accessing said first server and said second server with a client request for a Web page and a Web browser for displaying a Web page based on said Web page program, wherein said Web browser automatically changes from an original state to a proxy setup state with said proxy server function automatically downloaded from said second server via said communication network in response to the client request, and wherein said Web browser is adapted to read said Web page program and to activate said proxy server function of said Web page program for use at said client and to return the proxy setup for the Web browser to the original state when the Web page is closed.

2. The system according to claim 1, wherein said Web page program includes a proxy server program for implementing said proxy server function, and page data consisting of said Web page displayed by said Web browser of said client, and including a function for activating said proxy server program when said proxy server program is read by said Web browser.

3. The system according to claim 2, wherein said page data also includes a function for, before said proxy server program is activated, changing the proxy setup performed with said Web browser belonging to said client into a setup that is appropriate for the operation of said proxy server program.

4. A server for facilitating access to a Web-based application comprising:
   a connector, which is connected to a communication network, for accepting an access request for a Web page from a client; and
   a storage unit for storing a Web page program and for dynamically downloading said Web page program to a client upon receipt of said access request from said client via said connector, said Web page program including a proxy server function, that can display the requested Web page using a Web browser and that is activated when read at said client using said Web browser, without having to store, maintain, and configure proxy server functions at said client, wherein said Web browser automatically changes from an original state to a proxy setup state with said proxy server function, and wherein said Web browser is adapted to read said Web page program and to activate said proxy server function of said Web page program for use at said client and to return the proxy setup for the Web browser to the original state when the Web page is closed.

5. The server according to claim 4, wherein said storage unit stores said Web page program as contents corresponding to the World Wide Web.

6. A client computer for executing a Web-based application, without having to store, maintain, and configure proxy server functions at said client, comprising:
   a Web browser;
   a contents display unit for using the Web browser to display, as a Web page, contents that are provided from a server; and
   a proxy server function execution unit for reading, to said Web browser, a Web page program downloaded in response to a client request, which program includes a proxy server function, for displaying said Web page based on said Web page program, and for executing said proxy server function included in said Web page program, wherein said Web browser automatically changes from an original state to a proxy setup state with said proxy server function, and wherein said Web browser is adapted to read said Web page program and to activate said proxy server function of said Web page program for use at said client and to return the proxy setup for the Web browser to the original state when the Web page is closed.

7. The client computer according to claim 6, wherein, when said Web page program is read into said Web browser, said proxy server function execution unit changes the proxy setup performed with said Web browser so that a process performed by said proxy server function is initiated via said Web page program.

8. The client computer according to claim 7 wherein said process is initiated upon receipt of a request issued by said contents display unit.

9. The client computer according to claim 7 wherein said process is initiated when a reply is to be transmitted to said contents display unit.

10. The client computer according to claim 6, wherein a process during which, using said Web browser, said contents display unit displays a Web page is the same as a process during which, based on said Web page program, said proxy server function execution unit displays a Web page.

11. A proxy server control method for activating and halting a proxy server at a client computer in a distributed network comprising at least one client computer and at least one server comprising the steps of:

dynamically downloading a Web page program to a client automatically in response to a client request for a web page, said Web page program including a proxy server function for displaying a Web page using a Web browser, which program is activated when read using said Web browser;

changing the proxy setup performed with said Web browser, so that a process using said proxy server function is initiated via said Web page program at said client without said client having to store, maintain, and configure proxy server functions at said client; and using said Web browser to display said Web page based on said Web page program and to return the proxy setup for the Web browser to the original state when the Web page is closed.

12. A proxy server control method according to claim 11 wherein the process is initiated as a request for a server process.

13. A proxy server control method according to claim 11 wherein the process is initiated as a response to a reply from said server process.

14. The proxy server control method according to claim 11, further comprising the steps of:

storing an original proxy setup provided for said Web browser before said proxy setup is changed; and replacing an altered proxy setup provided for said Web browser with said originally provided proxy setup before said Web page displayed by said Web browser is closed.

15. A proxy server function provision method, for a client/server system wherein a network application based on the World Wide Web is operated, comprising the steps of:

loading onto a server, a Web page program having a proxy server function that can display a Web page using a Web browser, and that is read and activated using said Web browser;

dynamically downloading said Web page program from said server to an arbitrary client in response to a client access request;

reading said Web page program into said Web browser and displaying a Web page; and activating said proxy server function without having to store, maintain, and configure proxy server functions at said client, whereby said Web browser automatically changes from an original state to a proxy setup state with said proxy server function, and wherein said Web browser is adapted to read said Web page program and to activate said proxy server function of said Web page program for use at said client and to return the proxy setup for the Web browser to the original state when the Web page is closed.

16. A storage medium on which input means for a computer stores a computer-readable program, said program comprising:

a proxy server program for implementing a proxy server function and for dynamically downloading to a client a Web file comprising at least page data and said proxy server function in response to a client access request; and page data that consists of a Web page displayed by a Web browser, and that has a function for activating said proxy server function at said client when said page data are read into said Web browser without having to store, maintain, and configure proxy server functions at said client, whereby said Web browser automatically changes from an original state to a proxy setup state with said proxy server function, and wherein said Web browser is adapted to read said Web page program and to activate said proxy server function of said Web page program for use at said client and to return the proxy setup for the Web browser to the original state when the Web page is closed.

17. A program transmission apparatus comprising:

storage means for storing a Web page program having a proxy server function that can use a Web browser to display a Web page and that is read and activated by said Web browser; and transmission means for reading said Web page program from said storage means and for transmitting said Web page program to a client in response to a client request for said Web page for execution of said Web page program by said Web browser, whereby said Web browser automatically changes from an original state to a proxy setup state with said proxy server function, and wherein said Web browser is adapted to read said Web page program and to activate said proxy server function of said Web page program for use at said client and to return the proxy setup for the Web browser to the original state when the Web page is closed.

18. The system according to claim 1 wherein said first and said second server are the same server.

* * * * *